BEST AVAILABLE COPY

Sheet 1 - 2 Sheets.

R. T. Osgood.

Mower.

No. 149
No. 1252

Reissued Dec. 24, 1861.

BEST AVAILABLE COPY

R. T. Osgood.

Mower.

No. 149
No. 1252

Reissued Dec. 24, 1861.

UNITED STATES PATENT OFFICE.

CYRENUS WHEELER, JR., OF POPLAR RIDGE, NEW YORK, ASSIGNEE OF ROBERT T. OSGOOD.

IMPROVEMENT IN GRAIN AND GRASS HARVESTERS.

Specification forming part of Letters Patent No. 8,743, dated February 17, 1852; Reissue No. 1,252, dated December 24, 1861.

*To all whom it may concern:*

Be it known that ROBERT T. OSGOOD, of Orland, in the county of Hancock and State of Maine, invented certain new and useful Improvements in Machines for Harvesting Grain, Mowing Grass, &c.; and I do hereby declare that the following is a full, clear, and exact description of the same, reference being had to the accompanying drawings, making a part of this specification, in which—

Figure 1:
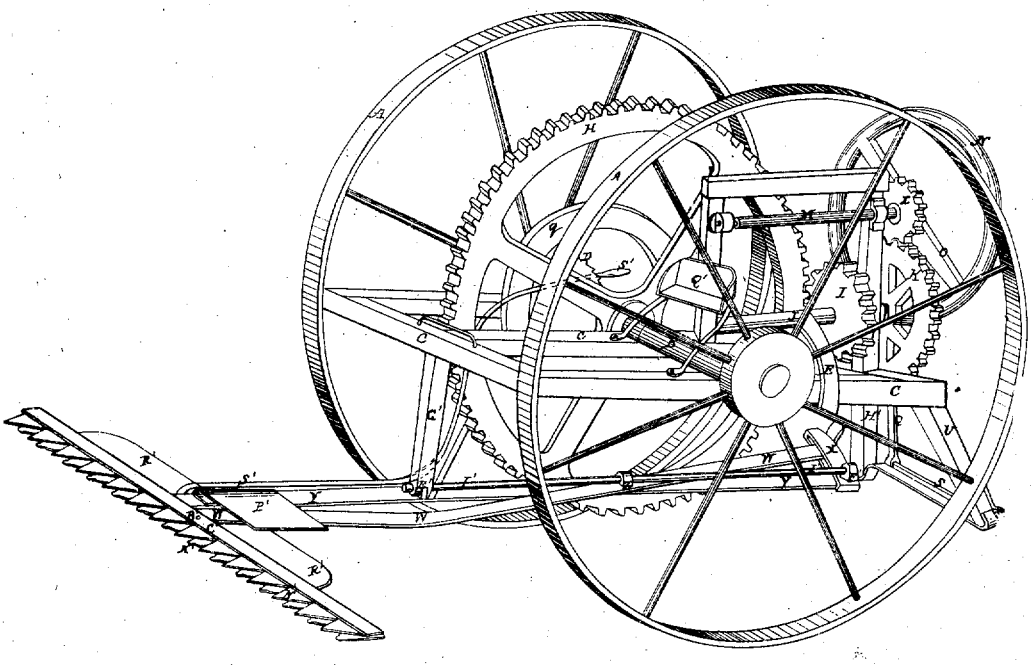
Figure 2:
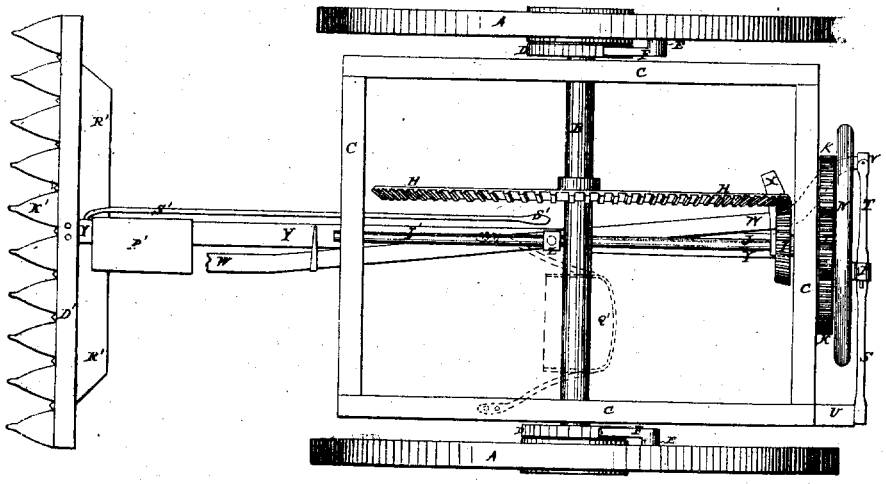
Figure 3:
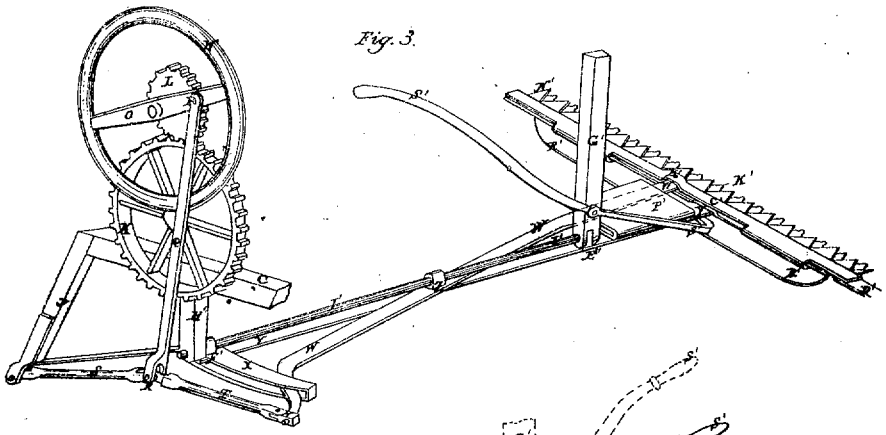
Figure 4:
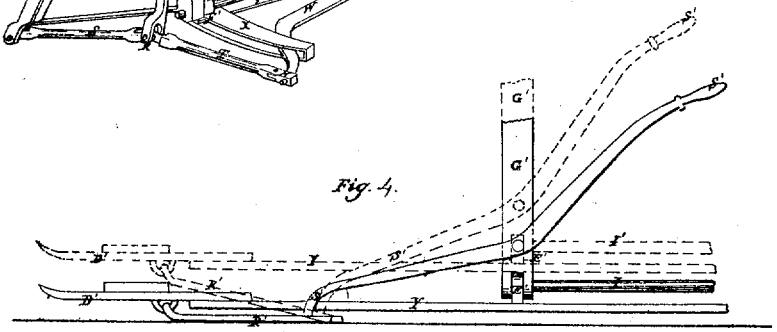
Figure 5:
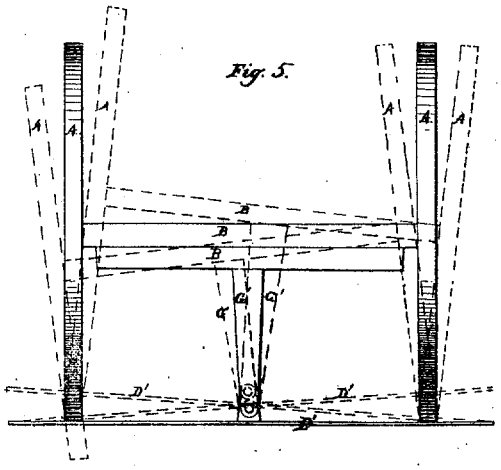

Figure 1 represents a perspective view of the machine, omitting the grain-receptacle, reel, and tongue. Fig. 2 represents a top plan of the machine, the same parts being omitted as in Fig. 1. Fig. 3 represents in perspective the cutting apparatus and gearing that drives it detached from the main frame and main wheels and axle. Fig. 4 represents detached and in two positions—one in black and the other in red lines—the finger-beam, its sole or shoe, and lever by which the cutting apparatus may be raised or lowered. Fig. 5 is designed to illustrate how the main wheels and the cutting apparatus may conform to the undulations of the ground without influencing each other in their action detrimentally.

Similar letters of reference, where they occur in the separate figures, denote like parts of the machine in all the drawings.

In the construction of a grain and grass harvester known as a "combined reaper and mower" there are many separate features that must be adaptable to both reaping and mowing machines, the conditions of each varying with the material to be cut and the nature of the ground over which the machine is to be operated. In cutting grain the cutters are raised some distance above the ground, and to the cutters an addition of some device is necessary for receiving the cut grain and delivering it in a proper shape for binding into sheaves. In cutting grass it is desirable that it should be left spread on the ground to facilitate its curing or drying, and to do so the grain-receptacle should be so made and arranged as to be readily and easily removed, and the cutting apparatus should be capable of being brought close to so as to travel on or near the ground, conforming as nearly as possible to its surface, and while thus conforming to the surface of the ground the cutters should vibrate with nearly uniform motion, whether the machine is moving in a direct line or on a curve to the right or to the left. To construct such a convertible machine as is adaptable both to mowing grass and reaping grain, and be susceptible of the necessary adjustment for each separate purpose, constitutes the general characteristics of this invention, the separate divisions of which will be fully described hereinafter under their distinctive and appropriate heads, some branches of which will form the subject-matter for separate applications for Letters Patent. It is obvious that several parts of the said improvements are applicable to various other reaping and mowing machines in use. One mode of applying each of these improvements to practical use is shown in this machine. It is therefore unnecessary to specify the manner of applying the parts respectively to other machines, as the ordinary skill of a constructer is sufficient for the purpose.

In mowing grass, if cut too high from the ground a loss is occasioned by the diminished yield of hay; if cut too close, great injury will frequently occur to the meadow by the heat of the sun drying the surface of the ground and burning and destroying the roots of the grass, producing comparative barrenness the following year; if cut too high in some places and too low in other places, a compound loss occurs. A skillful hand with a scythe can cut grass with a very good degree of uniformity on any ground that can be mowed; but his progress must necessarily be slow and his work laborious, and as time is more valuable at that season of the year this mode of harvesting grass is very expensive.

Machines have been constructed that will cut grass with a good degree of evenness on comparatively smooth land; but as heretofore constructed they have not carried their cutting apparatus in a way that left it free enough to conform to the surface of uneven ground, and as but little of the ground used for meadow has a plane surface, and a large proportion of it is rolling, undulating, and uneven, consequently their use on such land has been very limited, and when used it has been under great disadvantages.

To adapt a harvesting-machine to the mowing of grass in a proper and economical manner on uneven ground, it is necessary that the finger-beam and cutters, as they pass over the ground, should closely follow the surface, conforming freely to the undulations thereof, rising and falling in its entire length, or at either end independent of its other end, according to the varying inclination of the surface of the ground, so that the cutting apparatus shall at all times run as nearly parallel with the surface of the ground as possible, and as close thereto as the condition of the crop, the nature of the ground, and the safety of the cutters will permit. As the beam that carries the cutters must receive its progressive movements over the ground by means of the main frame, its connection therewith must be such that, while it receives its advancing movement therefrom, it will receive its vertical movements from the ground over which it passes, freely rising or falling in its entire length, or at either end independent of and without elevating or depressing its other end, and uninfluenced by the motions of the main wheels or main frame, except to advance it over the ground.

To overcome the difficulties mentioned, and to secure the desired results hereinabove stated, is the object of this branch of the said OSGOOD'S invention; and the nature of the invention consists in a floating finger-beam, so connected to or with the main frame that while it receives its progressive movements from the main frame it will receive all its vertical movements from the ground over which it is drawn, freely rising or falling in its entire length, or at either end independent of its other end, and independent of the motions of the main wheels and main frame, except to advance it over the ground.

The finger-beam must receive its progressive motions from the main farme, and must travel on the ground. If connected directly therewith, the beam must necessarily, some part of it, extend under the main frame, and the main frame must be brought down to the finger-beam and in such near proximity to the ground that, if hinged to the finger-beam in that position, the main frame would be more or less influenced by the projections on the surface of the ground, and would materially interfere with the free movements of the finger-beam and cutters. That the main frame may travel above the ground, while the finger-beam may at the same time travel outside of the main frame and on the ground, and receive all its vertical movements therefrom and conform to the surface thereof, and at the same time be properly supported laterally, the inventor has constructed and combined with the main frame and finger-beam an intermediate support or coupling-arm, and so connected it with the main frame by hinges that the finger-beam shall be rigid laterally, and at the same time free to rise and fall at either end vertically, according to the varying inclinations in the surface of the ground; and that the finger-beam and cutters may the more readily and perfectly conform to the undulating surface of the ground and follow the undulations closely, whether such undulations be longitudinally with, transverse, or diagonally to, the finger-beam and cutters, the inventor has made the beam short, so that while it gives sufficient protection and support to the cutters it shall not extend much beyond them at either end; and thus the following advantages are secured—viz:

First. The cutters will cut much nearer the ground when the beam is a chord to the curve in the ground than it would be if the beam extended beyond the cutters.

Second. If extending much beyond the cutters, its ends will at times travel along ridges and will be elevated above the ground, which ridges, if shorter, it would not have reached at all, and consequently would have carried the cutters so as to cut the stubble shorter.

Third. Because the shorter the beam that carries the cutters, and the freer it is to rise and fall at either or both of its ends, the more closely it will conform and the nearer it will cut to the surface of the uneven ground.

Fourth. The shorter the beam the less bearing surface it will have on the ground, and, having less bearing-surface, it will meet with fewer obstacles and have less friction, and less power will be required to move it over the ground.

Fifth. Being less in length, less materials are required for the same strength.

Sixth. Having less material, it has less weight, and, being of less weight, it rides more easily over the inequalities of the ground, and, riding more easily over the inequalities of the ground, there is less danger of injury to the cutting apparatus as well as to other parts of the machine. And this part of the invention consists in the combination of a short finger-beam—*i. e.*, one of only sufficient length to protect and support the cutting apparatus, and not extending much beyond the cutters at either end—with an intermediate hinged coupling-arm, or the equivalent thereof, to connect the finger-beam with the main frame in such a manner as to allow the beam to accommodate itself to the surface of the ground, either end of the beam rising and falling independent of its other end, and independent of the motion of the main wheels and main frame, except to advance it over the ground.

To enable others skilled in the art to make and use these improvements, I will proceed to describe the same in connection with the accompanying drawings.

A A are two main driving and supporting wheels of the same diameter, and loosely affixed on the opposite ends of the axle B, which is connected to the main frame C by suitable bearings or boxes, in which it revolves. The main frame C is of a rectangular form, and is suspended between the main wheels A A, and nearly balanced on the axle B, on which it can freely oscillate. To the main axle B, on each side of the main frame, and between it and the driving-wheels, are rigidly affixed the ratchet-wheels D, having notches or teeth in their peripheries.

To the inner side of the main wheels are connected webs or projections E, which carry dogs or pawls F, which are so set as to take into the notches of the ratchet-wheels D when the machine is moved forward, and slip over the notches when the machine is backed. Each dog or pawl has a spring, G, which presses upon them with sufficient force to insure at all times their taking into the notches of the ratchets when the machine is advanced, and with sufficient elasticity to yield and let the pawls slip over the notches when the machine is backed.

To the main shaft B is firmly fastened a main gear-wheel, H, which revolves with the shaft. With this wheel H the pinion I on the shaft J gears, said shaft J being supported by suitable bearings. On the outer end of the shaft J is rigidly affixed the gear-wheel K, which gears with the pinion L on the shaft M, which has also suitable bearings to turn in. The outer end of the shaft M carries a balance-wheel, N, crossed by arms O, to one of which is affixed a wrist or crank pin, P, to which one end of the pitman Q is connected, the other end thereof being connected at R to the toggle levers or links S and T. One end of the link S is pivoted to the lower end of the down-hanger U, which is fastened at its upper end to the rear left-hand corner of the main frame C. The other end of the link S hinges to the pitman Q. The other link, T, at its inner end fastens to the pitman at R, and its other end has a hinged piece, V, connected with it, which pivots onto the rear end of the vibrating lever W. By means of the piece V and its connection with the link or lever T and vibrating lever W two hinged connections are formed at right angles to each other, thus permitting the vibrating lever W to move in the arc of a circle, while the toggle lever or link T can move in the arc of a circle at right angles to that of the vibrating lever W, thus preventing the torsion that would occur to the vibrating lever and its connection if such connection of the toggle-link T was made by a single hinge. The vibrating lever W plays at its rear end in a slotted guide, X, which guide is secured to the rear end of the coupling-arm Y, and it is pivoted at Z to the coupling-arm Y, and has its front end pivoted to the cutter-bar C′ at B′.

The cutters are of the ordinary scalloped form, and are fastened to the bar C′ in the usual manner, and rest upon and vibrate over a series of fingers, K′, which are connected with and supported by the beam D′ in the ordinary manner. The cutters N′ receive their vibrating movements from one or both of the main wheels A A through the gearing and connections heretofore described.

D′ is the finger-beam, which supports and carries the cutters. To this finger-beam is connected a coupling-arm, Y, which extends under the main frame, and is connected thereto by hinges E′ F′, uniting it to the down-hangers G′ H′.

R′ is an adjustable sole hinged to the finger-beam D′, and extending under the back of it, so that by pressing down its rear part the beam and cutters are raised from the ground, as shown by the red lines of Fig. 4. S is a lever, the lower end of which rests on the upper side of the rear edge of the sole R′. The other end of the lever extends upward and backward to near the driver's seat. This lever has a pivoted connection with the down-hanger G′, so that the driver can by operating said lever raise or lower the beam and cutting apparatus at pleasure while the machine is in motion over the ground.

As heretofore stated, the reel, grain-receptacle, and tongue are omitted in these drawings. Of the reel and grain-receptacle it is unnecessary to mention them further than to state that when the machine is used for reaping grain they are introduced, but when used for mowing grass they are removed. Of the tongue it may be necessary to state that, as the main frame is supported and nearly balanced on the axle B, and should be free to oscilate thereon, its motion must not in that particular be restrained by said tongue, and that it should not do so it ought to be attached to the main frame by eyebolts or hinges, and so that the team connected to the tongue can travel beside the standing grain or grass in the previously-made swath. The team thus, by means of the draft-pole, moves the machine forward and steadies it laterally, its hinged connection therewith leaving it free to rise and fall at its front end. The transmission of the power required to drive the cutters from where it is generated to where it is applied tends to hold down the forward end of the main frame; but the main frame and gearing, with the finger-beam and coupling-arm, are so balanced that the beam will not be forced or held down to any injurious extent or degree, but only with that force necessary to keep it on the ground when working, and prevent its bouncing upward by slight inequalities on the surface of the ground. The progressive motion of the frame on its wheels carries forward the coupling-arm, and that in its turn carries forward the finger-beam and cutters, and as the main frame is free to oscillate on its axle the beam necessarily rests upon the surface of the ground, and as the coupling-arm, which carries the beam, is connected to the main frame by hinges, the beam and cutters are free to assume any position that may be required by the varying undulations of the surface of the ground, some of which positions are shown in Fig. 5, and the supporting-wheels and main frame can also assume any position required by the varying undulations of the surface of the ground over which the main wheels are passing, some of which positions are also shown in Fig. 5, so that in passing over uneven ground the finger-beam will rise or fall in its entire length or at either end independent of the other, thus floating over the surface of the ground and receiving its up and down movements therefrom and conforming to its surface uninfluenced by the main wheels or main frame except to advance it over the ground.

The intermediate coupling-arm permits the main frame to travel above the ground and high enough to keep the gearing clear of the grass, &c., while the finger-beam, which it carries, travels on the ground below and outside of the main frame. The finger-beam being made short, as shown in the drawings, it conforms to the varying inclinations of the surface of the ground, and, presenting the least possible bearing-surface consistent with sufficient strength and due protection to the cutters, it rides easily over the ground, and follows closely the inclinations thereof.

What is claimed in this patent as the invention of the said ROBERT T. OSGOOD is—

1. A hinged finger-beam so connected to or with the main frame that while it receives its advancing movements from the main frame it will in its upward and downward movements conform to the surface of the ground over which it passes, substantially as herein set forth.

2. In combination with the main frame and finger-beam, the intermediate hinged coupling-arm, whereby the progressive movements of the finger-beam and cutters shall be controlled by the main frame, while in their upward and downward movements they may conform to the undulations of the ground over which they pass.

3. The short finger-beam, in combination with the intermediate hinged coupling-arm, substantially as described.

CYRENUS WHEELER, JR.

Witnesses:

L. A. PRATT,

CHAS. CAMPBELL.